INVENTOR.
HERBERT W. GRONEMEYER
BY
Alfred R. Fuchs
ATTORNEY

Feb. 1, 1955  H. W. GRONEMEYER  2,700,814
BALL FORMING AND SEPARATING MACHINE AND METHOD
Filed May 26, 1949  6 Sheets-Sheet 2

INVENTOR.
HERBERT W. GRONEMEYER
BY Alfred R. Fuchs
ATTORNEY

Feb. 1, 1955 H. W. GRONEMEYER 2,700,814
BALL FORMING AND SEPARATING MACHINE AND METHOD
Filed May 26, 1949 6 Sheets-Sheet 3
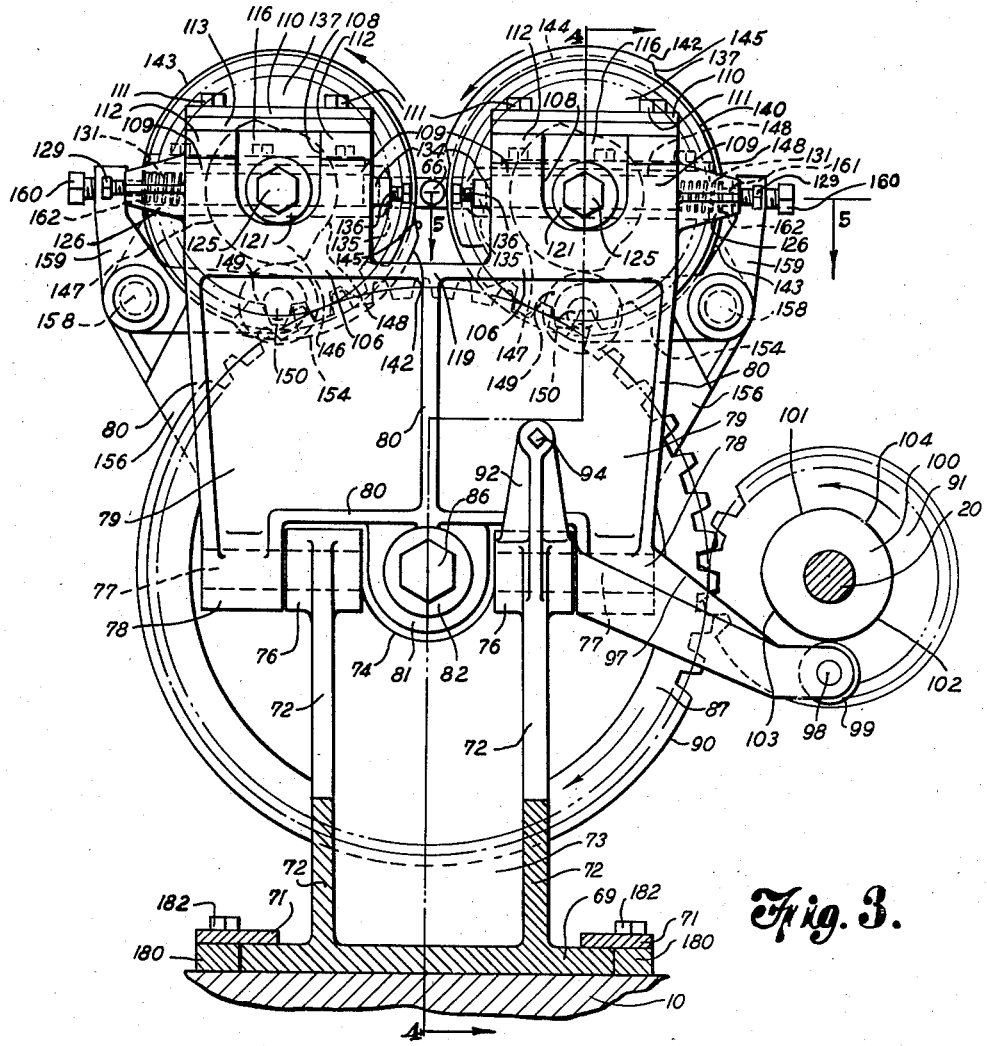
Fig. 3.
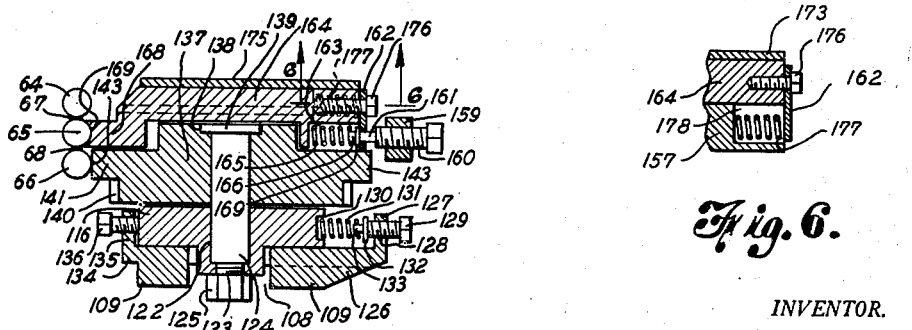
Fig. 5.
Fig. 6.
INVENTOR.
HERBERT W. GRONEMEYER
BY
Alfred R. Fuchs
ATTORNEY INVENTOR.
HERBERT W. GRONEMEYER
BY Alfred R. Fuchs
ATTORNEY

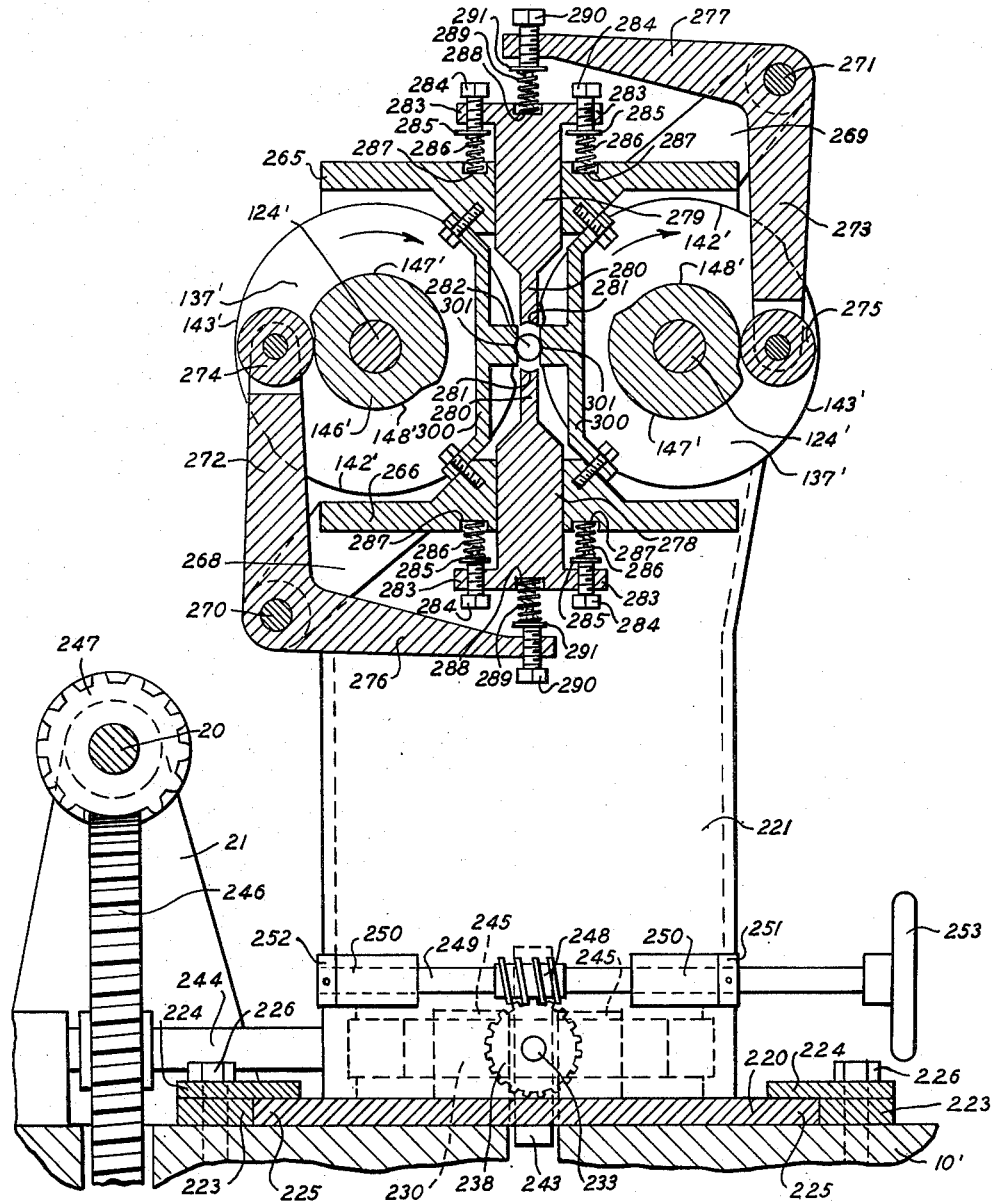

United States Patent Office 2,700,814
Patented Feb. 1, 1955

2,700,814

BALL FORMING AND SEPARATING MACHINE AND METHOD

Herbert W. Gronemeyer, Kansas City, Mo., assignor to Armco Steel Corporation, a corporation of Ohio Application May 26, 1949, Serial No. 95,483

14 Claims. (Cl. 29—148.4)

My invention relates to a method and apparatus for forming balls, and more particularly to a continuous method of forming grinding balls and an apparatus for carrying out such a continuous method, the invention being an improvement over that disclosed in my application Serial No. 431,874, filed May 24, 1954, which is a continuation of my application Serial No. 58,933, filed November 8, 1948 and now abandoned, on Continuous Method and Apparatus for Forming Balls.

In carrying out my improved method, the grinding balls or similar steel balls are formed from a length of rod or other shape by a continuous process in a method similar to that disclosed in my above referred to co-pending application. The forming of the balls on the rod can be carried out in substantially the same manner as described in said aforementioned application and the apparatus for providing the ball formations on the rod-like member or other shape is similar to that disclosed in said application.

In forming the grinding balls from the rod-like member or other rolled shape, ball formations are formed by passing a rod-like member or shape with swages provided therein between a pair of rolls rotating about parallel axes, which swage the partly formed rod-like member or shape at points substantially 90° around the rod from the first swages formed therein to form substantially ball-like or spherical members of said rod-like member that are connected by relatively thin short connecting portions between them. This can be done in a similar manner to that described in the above referred to application by apparatus operating on the rod-like member in a similar manner to that described in said co-pending application.

The principal improvement in the method and apparatus forming the subject matter hereof over that in the above referred to co-pending application is in the method and apparatus of separating the connected ball formations provided on the rod-like member from each other so as to make single balls of a series or string of balls as the same is discharged from the second set of rolls. Instead of sawing or cutting the thin connecting portions between the balls to separate the same, this is accomplished by a twisting operation, that is, one ball is rotated substantially about the longitudinal axis of the rod relative to the next adjacent ball so as to twist off the connecting portion between the two balls.

My invention accordingly comprises the method of forming grinding balls by first swaging rod-like members at opposite points along the length thereof and then at points at 90° around the rod thereto, to provide the connected ball-like formations and then twisting off the ball-like formations so as to provide the separate balls.

The balls formed in this manner by my improved process may be given a finishing operation by being placed in the usual sizing means, preferably, immediately after being twisted off, if there are any small irregular places on the balls where the connecting portions were twisted off. The sizing machine is a well known apparatus for finishing balls to make the same more truly spherical, such as shown in the patent to Fred H. G. Brandt on Apparatus for Shaping and Sizing Balls, No. 2,178,031, patented October 31, 1939.

It is an important purpose of my invention to provide twisting means for twisting off the balls so as to separate the same as above stated, which is operated in synchronism with the rolls so that the twisting mechanism will move into proper relative position to the ball formations to engage a ball formation to rotate the same about the axis of the rod-like member or substantially such an axis while holding an adjacent ball from rotating along with the ball that is being rotated to twist it off. The ball separating means, preferably, comprises holding means and twisting or ball rotating means that are operated in synchronism and that move, during the operation of twisting off the balls, in the direction of the discharge of the connected series of balls from the forming machine, at the same rate that said connected series of balls is moving in said direction.

In order to accomplish this with successive balls it is necessary that the twisting apparatus oscillate or reciprocate so as to move alternately a definite distance toward and away from the forming means, or in a direction opposite that to the direction of discharge of the string of balls from the forming apparatus and in the direction of discharge of the balls from the forming apparatus. The holding and twisting means operate in such timed relation to the oscillating or reciprocating means that the holding means and the forming means will always move into proper cooperative relationship to the ball formations which these are to engage during each twisting operation, and will be out of engagement with the balls during the return movement of said twisting mechanism so as to permit the forward feed of the chain or string of balls in the direction of feed thereof during such return operation without any interference of the twisting mechanism therewith.

It is a further important purpose of my invention to provide means whereby a plurality of balls in a connected series or string of ball formations can be separated from each other simultaneously. This is desirable in order to speed up the operation of the machine and to thus produce a larger quantity of balls per machine for each period of operation thereof.

It is another important purpose of my invention to provide means for adjusting the position of the ball separating means relative to the ball forming means and of the two sets of rolls relative to each other so as to have the formations on a rod-like member move into proper cooperative relation to the second set of rolls and the ball formations into proper cooperative relation to the twisting off mechanism.

Other objects and advantages of my invention will appear as the description of the drawings proceeds. I desire to have it understood, however, that I do not intend to limit myself to the particular details shown or described, except as defined in the claims.

In the drawings:

Fig. 3 is an end elevation of the ball separating or ball twisting off mechanism.

Fig. 5 is a section taken on the line 5—5 of Fig. 3.

Fig. 6 is a fragmentary detail sectional view taken substantially on the line 6—6 of Fig. 5.

Fig. 9 is a vertical section taken on the line 9—9 of Fig. 7.

Figure 1:
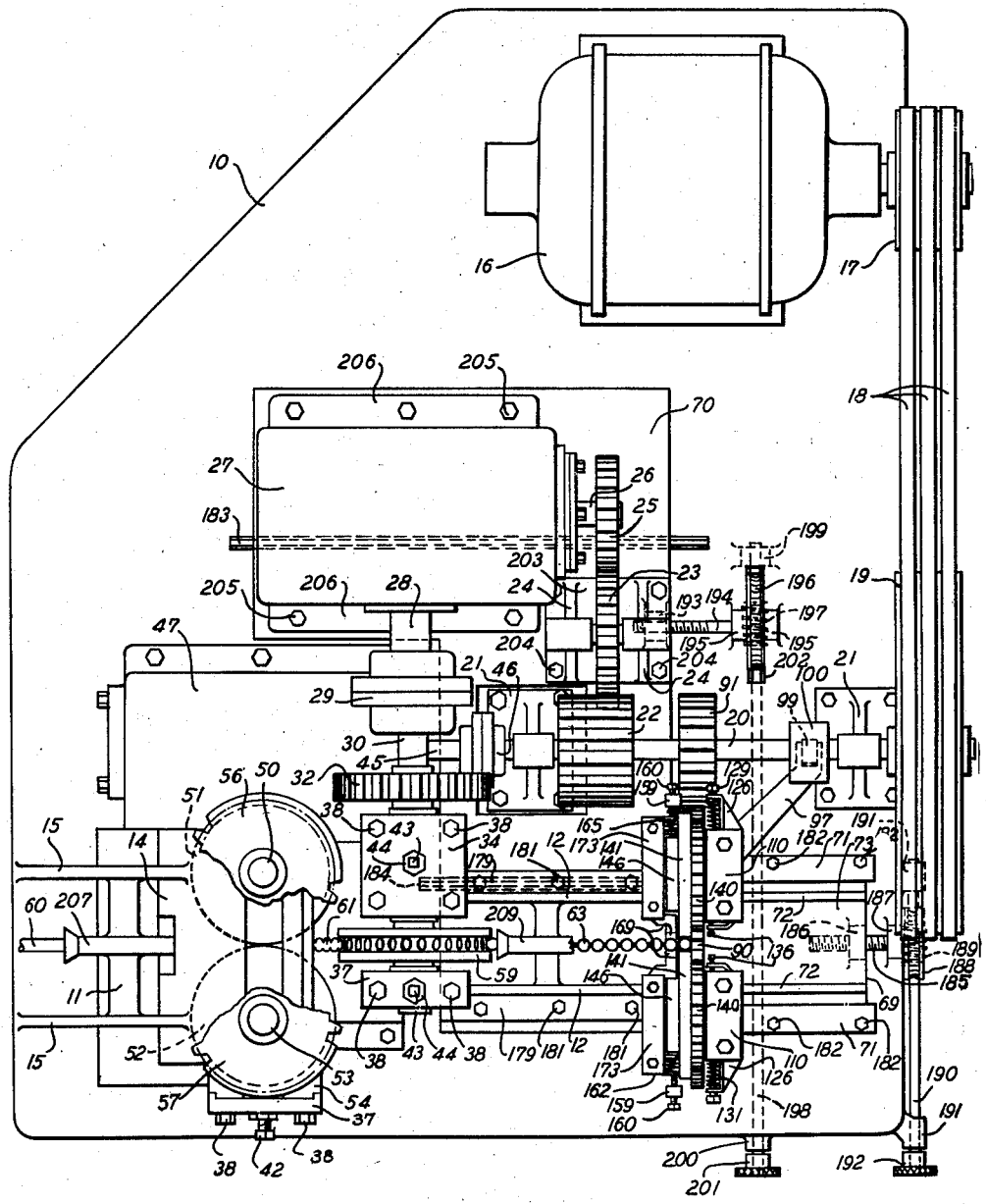
Fig. 1 is a plan view of my improved ball forming apparatus, partly broken away.

Referring in detail to the drawings, my improved ball forming machine is provided with a base 10, from which frames 11 and 12 extend upwardly. The frame 11 has a recess therein at 13 providing a lateral arm 14 thereon above the main body portion of said frame, and ribs 15 are provided on said frame to stiffen and strengthen the same.

The motor 16 is mounted on the base member 10 and is provided with a pulley 17 that is provided with a plurality of grooves in which a plurality of belts 18 operate, which also operate in grooves in a multiple groove pulley 19 that is mounted on a shaft 20 to rotate therewith. The shaft 20 is mounted in bearings in a plurality of standards 21 mounted on the base 10, and a wide faced gear 22 is mounted on the shaft 20 to rotate therewith. A gear 23 meshes with the gear 22, the same being mounted in suitable bearings provided on the bearing standards 24, and said gear 23 meshes in turn with a gear 25 that is mounted to rotate with the input shaft 26 of a reduction gearing 27 mounted on an adjustable sub-base 70 on the base 10, said reduction gearing having an output shaft 28.

Figure 2:
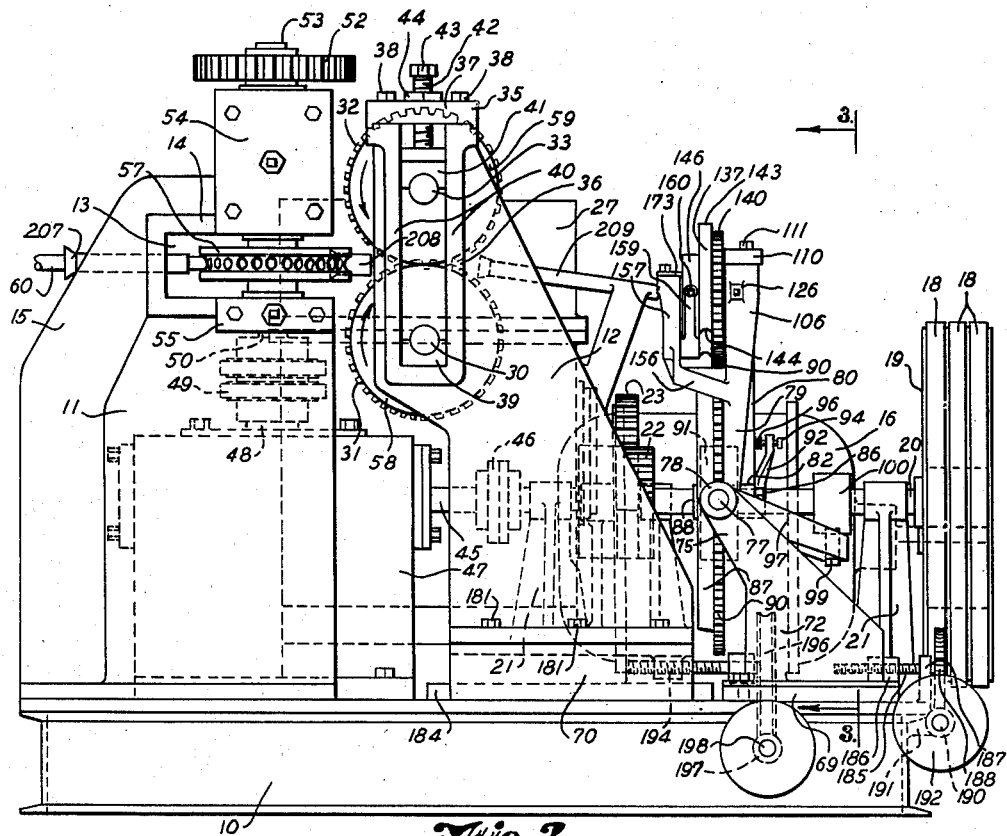
Fig. 2 is a view in side elevation thereof.

A flexible coupling 29 connects the output shaft 28 of the reduction gearing with a shaft 30, which has a gear 31 thereon meshing with the gear 32 fixed on the shaft 33 to drive it in the opposite direction and at the same speed as the shaft 30. The shafts 30 and 33 are mounted in bearing members, which are indicated generally at 34 and 35 in Fig. 1. These bearing members, except for width, are similar in construction. The bearing member 35 is shown in Fig. 2 as comprising a yoke-like member 36 formed on the frame 12 and a cap member 37 secured to the upper end faces of said yoke-like formation 36 by suitable fastening elements 38. A lower bearing member 39 for the shaft 30 is mounted in the bottom of the yoke-like member 36 between the arms 40 of the yoke 36, serving as guiding and confining means for the bearing members. An upper bearing member 41 is mounted slidably between said arms 40 for guided movement and provides a bearing for the upper shaft 33. The position of the bearing member 41 is adjusted by means of a screw-threaded member 42 screw-threadedly mounted in the cap member 37 and having a polygonal formation 43 thereon for rotating the same. Suitable means, such as a nut 44, may be provided for holding the adjusting screw in adjusted position. The cap member 34 is similarly mounted and is provided with similar bearing means and with the same adjusting means as above described, the same reference numerals being applied to the corresponding parts of the bearing members 34 and 35 in Fig. 1.

The shaft 20 is connected with a shaft 45 by means of a flexible coupling 46. Said shaft 45 is the input shaft of a reduction gearing, indicated generally at 47, said reduction gearing having an output shaft 48, which is connected by means of a flexible coupling 49 with a shaft 50. The shaft 50 has a gear 51 fixed thereon, which meshes with a gear 52 that is fixed on the shaft 53. Bearing means that are substantially the same as the bearing means 34 and 35 are provided for the shafts 50 and 53, these being indicated by the numerals 54 and 55 in Fig. 2, the yoke-like formations on the frame 11 being provided on opposite sides of the opening 13 for mounting said bearings on said frame. The bearing member 54 is also seen in Fig. 1, the adjusting means 42 thereof and the cap portion 37 thereof being shown in said figure. However, the remainder of the bearing structure is hidden in Fig. 1 behind the structure located above the same.

A pair of rolls is provided for forming swages in a rod-like member in the manner described in my co-pending application Serial No. 58,933, said rolls being mounted on the shafts 50 and 53, the roll 56 being mounted on the shaft 50 and the roll 57 being mounted on the shaft 53. The details of construction of the rolls is substantially the same as disclosed in said co-pending application and said rolls are rotated in opposite directions about their axes in the same manner as described in said co-pending application to form the swages on a rod-like member fed between the same. One of the gears of each of the paired gears 31 and 32, and 51 and 52 is provided with adjusting means such as disclosed in my above referred to co-pending application, so as to bring the die means on the cooperating rollers in proper cooperative relation to each other.

Mounted on the shafts 30 and 33 are a pair of cooperating rolls 58 and 59, which act on the steel shape, such as the bar-like member 60, after it has passed through the swaging rolls 56 and 57 to form ball formations thereon in the same manner as described in my said co-pending application. The swaged rod-like member is indicated by the numeral 61 in Figs. 1 and 2. In Fig. 2 the swaged rod is shown as just starting to pass through the second set of rolls 58 and 59, and in Fig. 1 it is shown as having passed through said second set of rolls, the series of connected ball formations 63 resulting from passage through the rolls 58 and 59, being shown in Fig. 1 as extending into the separating means for the balls, to be described below. When the balls leave the pair of rolls 58 and 59 the same comprise spherical ball formations, such as indicated in Fig. 5 by the numerals 64, 65 and 66, which are connected together by short thin neck portions, such as indicated at 67 and 68 in Fig. 5. The connecting formations 67 and 68 are of small diameter and short, but sufficient to hold the ball formations together in a string or series.

Mounted on the base 10 is a supplemental frame 69, which is mounted for longitudinal adjustment on said base, being slidably mounted between a pair of guides comprising the plates 71 overlapping said base and the spacer bars 180 secured to the base by headed fastening elements 182 (see Fig. 3). Said supplemental frame is adjusted by means of the screw-threaded shaft 185 engaging a threaded sleeve 186 fixed on said frame 69, said shaft being mounted in a bracket 187 on the base 10 against endwise movement. A worm wheel 188 is fixed on said shaft, a worm 189 engaging therewith. The worm 189 is mounted on a shaft 190 mounted for rotation in bearing brackets 191 on the base 10, and having a hand wheel 192 thereon for operating the adjusting means.

Said frame 69 has a pair of upstanding walls 72 thereon, and has an obliquely extending wall 73 connecting said upstanding walls. Said obliquely extending wall has a curved top edge 74. The walls 72 terminate in upwardly obliquely extending ears 75 that have the bearing portions 76 provided thereon at the top of said frame. The bearing portions 76 have a pair of stub shafts 77 mounted for rotation therein, and on said stub shafts are mounted a pair of sleeve-like formations 78 provided on a movable frame member 79, forming pivot bearings for said shafts.

Said movable frame member 79 is provided with an upstanding plate-like wall portion that has a plurality of reinforcing ribs 80 thereon, and which has an ear portion 81 thereon that extends between the bearing portions 76, and said portion 81 has a boss 82 thereon that has a socket portion 105 provided therein, from which a reduced bore 83 extends. A stub shaft 84 is mounted in the socket 105 and has the threaded shank portion 85 of a headed fastening element 86 that extends through the bore 83 screw-threadedly engaging therewith to clamp the stub shaft 84 in the socket 105.

A gear 87 having a hub portion 88 is mounted on the stub shaft 84 having a rim 89 offset from the main body portion of said gear that is provided with teeth 90. The teeth 90 of the gear 87 mesh with a wide faced gear 91 fixed on the shaft 20. Said gear 91 rotates in the direction indicated by the arrow in Fig. 3 and the gear 87 rotates in the direction indicated by the arrow thereon in Fig. 3. A bracket 92 extends upwardly from one of the bearings 76 on the frame 69 and has a screw-threaded opening in the upper end thereof receiving the threaded portion 93 of an adjustable stop member 94. Said stop member has a bearing plate 95 on the end thereof, against which one end of a compression coil spring 96 engages, said spring also engaging the plate-like body portion of the frame 79.

The frame 79 has an arm 97 extending therefrom at an oblique angle downwardly toward the shaft 20 and in a direction away from the gear 87. Said arm 97 has a pivot pin 98 provided on the bifurcated end portion thereof for a cam roller 99. The cam roller 99 engages a wide faced cam 100 on the shaft 20. The cam 100 is fixed on the shaft 20 and has a high portion 101, a low portion 102, a gradually rising portion 103 extending from the low portion 102 to the high portion 101, and a gradually receding portion 104 extending from the high portion 101 to the low portion 102. Accordingly as the cam rotates in the direction of the arrow thereon the roller will be forced downwardly as the roller travels along the rising portion 103 of the cam, which causes the arm 97 to swing about the axis of the stub shafts 77 clockwise or downwardly, as viewed in Fig. 4, causing the upstanding frame member 79 to swing about the axis of the stub shafts 77 so that the upper portion will swing to the right as viewed in Fig. 4, or toward the observer as viewed in Fig. 3. When the receding portion 104 of the cam engages the roller 99, then the opposite movement will take place, as the spring 96 will have been compressed by the above referred to movement of the plate-like member 79, thus holding the roller 99 in engagement with the cam and moving the upstanding plate-like member 79 to the left.

Figure 4:
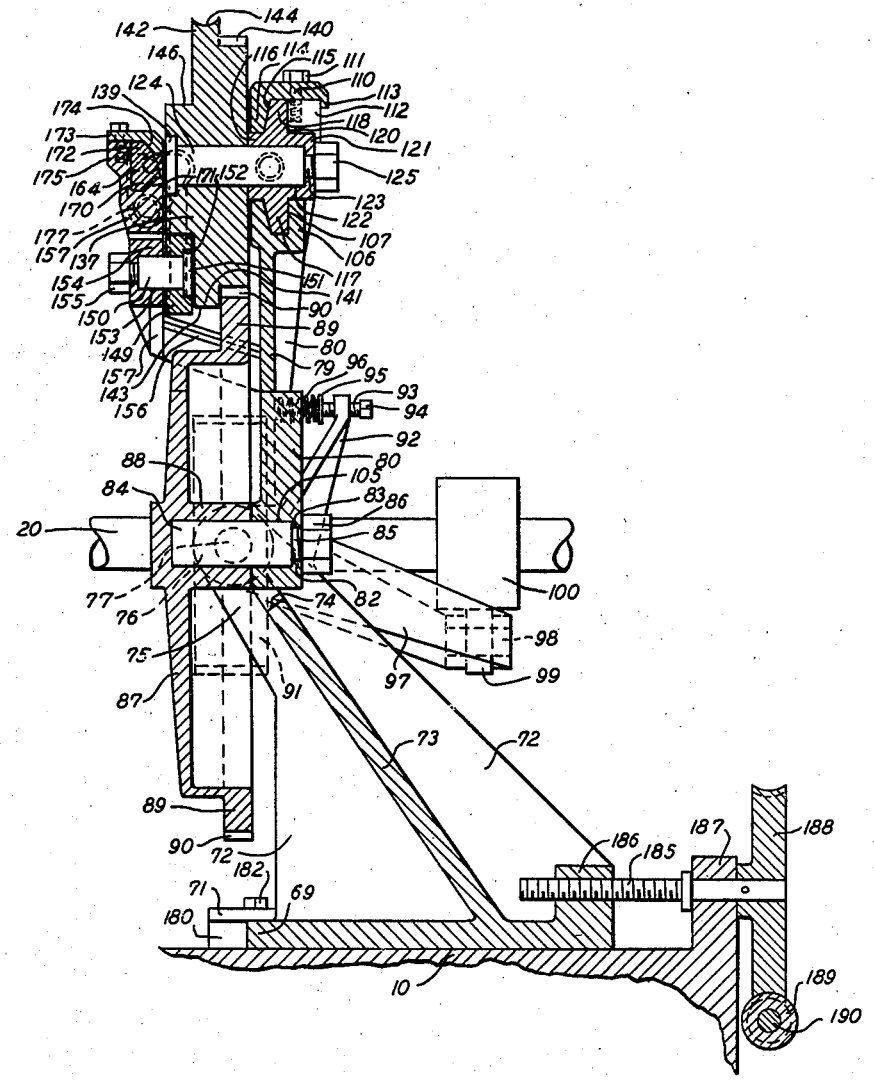
Fig. 4 is a section taken on the line 4—4 of Fig. 3.

As shown in Figs. 3 and 4 the roller 99 is on the rising portion of the cam and the rocking frame member 79 is starting on its movement to the right in Fig. 4. It will be noted upon reference to Fig. 2 that this movement is away from the rollers by which the series or string of balls is formed, or in the direction of discharge of the string of balls 63. Under the influence of the spring 96 the parts are moved back to the position shown in Fig. 4 as the roller is engaged by the receding portion 104 of the cam.

The frame 79 has thickened portions 106 in the upper end thereof that are connected together by a thick portion 119 and each of the portions 106 has a tapering groove 107 therein that extends transversely of the axis of the shaft 84 in a substantially horizontal direction. Each of said members 106 has a U-shaped recess 108 therein providing a pair of upwardly extending legs 109 on each of the portions 106, and detachably mounted cap members 110 are secured to the upstanding legs 109 by suitable securing elements 111, the upper portions of the legs 109 being thickened, as at 112, for receiving said cap members, said cap members each having an overhanging flange 113 extending downwardly over the forward wall of the upper portion 112 of each of the legs 109. Each of said cap members also has a rear depending flange 114 thereon that has an inclined wall 115.

A substantially rectangular slide 116 is mounted in each of the forward extensions 106, each of said slides having a downwardly extending tapering portion 117 mounted in the tapering guide groove 107, and an upwardly extending tapering portion 118 that engages the inclined wall 115 of the cap member and vertical walls 120 on the portions 112 of the upward extensions. Each of said slides has a boss 121 extending therefrom mounted in the U-shaped opening 108, and has a cylindrical bore 122 therein extending parallel to the axis of the shaft 84, and an opening 123 of reduced diameter extending through the wall of the boss 121. A stub shaft 124 is mounted in the bore 122 and a screw-threaded headed member 125 engages screw-threadedly with the stub shaft 124 to secure the same in said bore 122.

Each of the upward extensions 106 has a bracket 126 formed thereon projecting in opposite directions relative to each other, said brackets being on the sides of the extensions away from each other. Each of said brackets has an ear 127 thereon that has a screw-threaded opening 128 therein, with which the screw-threads of the screw-threaded headed element 129 engage. Each of said slides 116 has a socket 130 formed therein, which is axially aligned with the screw-threaded headed member 129, and a coil compression spring 131 is mounted in said socket and between the bottom of said socket and a washer 132 mounted on the reduced inner end portion 133 of the screw-threaded headed member 129.

The opposite side of each upward extension 106 is provided with a bracket 134, which has a transversely extending ear 135 thereon that has a screw-threaded opening therein receiving the screw-threaded headed member 136, which serves as an adjustable stop means for the slide 116. Each slide is urged toward said stop means by the spring 131 associated therewith, the slides thus having a tendency to move toward each other into engagement with said stops. The movement of said slides is small so that there will be no interference with the sliding movement thereof in accordance with the setting of the stops by engagement of the hub portions 121 with the walls of the U-shaped openings 108. Obviously the compression of the springs 131 can be adjusted by means of the screw-threaded members 129. Mounted for rotation on the stub shafts 124 are rotatable members 137. Each of said members 137 is provided with a recess 138 therein receiving the round head 139 on the shaft 124. Thus the rotatable member 137 is held assembled with the shaft 124 and is free to rotate therearound.

The member 137 has a stepped contour, the same comprising a circular toothed portion 140, which constitutes a gear integral with each of the members 137, the teeth 140 meshing with the teeth 90 on the gear 87. This will cause the rotatable members 137 to rotate in the direction indicated by the arrows in Fig. 3. Each of said members 137 also has a central portion 141 of slightly larger diameter than the toothed portion 140, and said central portion 141 has a grooved portion 142 that projects outwardly beyond the portion 143 thereof that is not grooved.

The portion 143 is provided with a cylindrical face, as will be obvious from Fig. 4, while the projecting portion 142 has a transversely concave groove 144 therein. Inclined portions 145 connect the portions 142 and 143.

The member 137 is also provided with a cam portion 146, which has a high portion 147 and a low portion 148 thereon. Cooperating with the cams 146 are rollers 149. The rollers 149 are mounted on stub shafts 150, which have heads 151 that are mounted in recesses 152 in said rollers. Said shafts 150 are mounted in bores 153 in arms 154, being secured in said bores by screw-threaded headed fastening elements 155 screw-threadedly engaging said stub shafts 150 and extending through reduced openings in the arms 154 aligning with the bores 153. The arms 154 are portions of bell crank levers, which are mounted on the frame 79, said frame having upwardly inclined arms 156 thereon, which have the upstanding portions 157 in which the pivot pins 158 for said bell crank levers are mounted. Said bell crank levers also have the arms 159 thereon that are laterally offset from the arms 154 and have the screw-threaded headed members 160 screw-threadedly engaged in openings therein. Each of said screw-threaded headed members has a reduced portion 161 thereon, which extends through an opening in a plate 162 and into a pocket or recess 163 in a reciprocable member 164.

A coil spring 165 is mounted in the recess 163 and surrounds the reduced inner end 166 of the member 161, and bears against a washer 167, bearing against the shoulder between the portions 161 and 166 of the member 160. Rocking of the bell crank levers 154—159 thus will reciprocate the members 164 through the medium of the compression coil springs 165, thus moving the members 164 toward each other upon engagement of the rollers with the high portions of the cams and away from each other upon engagement of the rollers with the low portions of the cams. Each of said reciprocable members 164 is provided with an offset end portion 168 that terminates in a concave jaw 169. Said jaws 169 may be provided with suitable means therein for providing gripping surfaces thereon, should this be found desirable.

Upon reference to Fig. 5 it will be noted that the two gripping jaws 169 will engage opposite sides of the ball formation 65 when the parts are in the position shown in Fig. 5, which is the position in which the rollers are in engagement with the high portions of the cams, as shown in Fig. 3. The gripping action of said members 169 will continue as long as the high portions of the cams are in engagement with the rollers and for that period of time the ball formation 65 will be held against rotation.

It will be obvious upon reference to Fig. 3 that the grooved portions 142 of the members 137 are moving into a position where the same will engage the ball formation 66 adjacent the ball formation 65. As the grooved roller formations of said members 137 are moving in opposite directions, this will cause the ball formation 66 to rotate about an axis parallel to that of the stub shafts 124, which will cause the ball formation 66 to be twisted off the ball formation 65.

As the series of connected balls 63 is moving toward the right in Fig. 2, which would also be toward the right in Fig. 4, the entire apparatus comprising the members 137 and gripping members 169 and their mounting must move with said series of balls as this twisting off operation is taking place. This is accomplished by means of the cam 100, which oscillates or rocks the frame 79 about the axis of the stub shafts 77 in the proper direction to compensate for this forward movement of the series of balls during the twisting operation. The arrangement of the cams is such that the high portions 147 of the cams 146 engage the rollers 149 at the same time that the rising portion 103 of the cam 100 engages the roller 99. However, the ball rotating portions 142 of the rotatable members 137 do not engage the ball formation 66 until the ball formation 65 has been firmly engaged by the gripping means 169, or in other words, until after the high portions 147 of the cams have already engaged the rollers 149.

The reciprocable ball gripping members 164 are slidably mounted in the upstanding frame portions 157 having tapering portions 170 mounted in a correspondingly shaped groove 171 in each frame portion 157, and each having a tapering portion 172 mounted in a guideway formed therefor by the cover plate 173, having an inclined wall portion 174, and the recessed upper end portion 175 of the frame portion 157, on which it is mounted. The reciprocable members 164 are moved positively into ball formation gripping position through the action of the cams 146, rollers 149 and bell crank levers having the arms 159, through the members 160 and the heavy compression springs 165.

The plate-like members 162 serve to move the gripping members out of ball formation gripping engagement, being fixed to the members 164 by the headed screw-threaded fastening elements 176, and a compression coil spring 177 being mounted in a recess 178 in each frame portion 157, which spring is compressed as the member 164 moves to the left as viewed in Figs. 5 and 6. Accordingly, when the rollers 149 are engaged by the low portions 148 of the cams, said springs 177 will act to move the reciprocable members 164 away from each other, disengaging the ball formation 65. This occurs after the ball formation 66 has been completely twisted off from the ball formation 65 and the low portions 143 of the rotatable members 137 have moved into position opposite each other during rotation thereof.

After the gripping members 169 have released the ball formation 65, the high portion 101 of the cam engages the roller 99 and then the receding portion 104 of the cam 100 engages said roller, which causes the return of the frame 79 to its position nearest the ball rolling mechanism. The forward movement of the series of balls discharged from the forming rolls continues while this return movement is taking place, because there is nothing to prevent such forward movement inasmuch as the gripping means 169 is out of engagement with the ball formations, as is also the grooved portion of each of the rotatable members 137. The oscillating movement of the frame 79 is just sufficient that the gripping means 169 will, when the low portion 102 of the cam 100 is reached, be opposite the next ball formation 64 and the ball formation 65 will be opposite the portion 141 of the rotatable member 137, whereupon the rollers 149 will again be engaged by the rising portions of the cams 146 and be subsequently engaged by said high portions 147 to cause the next ball formation 64 to be gripped by the gripping jaws 169 and the previously gripped ball formation 65 to be twisted off in the same manner as previously described.

It will be noted upon reference to Fig. 1 that the frame 12 has flanges 179 thereon through which the fastening elements 181 extend that secure the frame in position on the sub-base 70. Said sub-base is slidably mounted for movement on the rails 183 and 184, which are grooved to receive ribs on the under side of the sub-base 70 (not shown). An internally threaded sleeve 193 is fixed on the sub-base 70 and a screw-threaded shaft 194 engages therewith, said shaft being rotatable in and fixed against axial movement relative to bearing members 195 mounted on the base 10. A worm wheel 196 is mounted on said shaft 194 to rotate therewith and said worm wheel is engaged by a worm 197 provided on the shaft 198 mounted in bearings 199 and 200 on the base 10. A hand wheel 201 is provided on the shaft 198 to rotate the same and an opening 202 is provided in the base 10 through which the worm wheel 196 projects. The bearing members 24 have a base 203 which is secured to the sub-base 70 by means of headed fastening elements 204 and the reduction gearing 27 is secured to said sub-base by means of headed fastening elements 205 extending through the flanges 206 thereon. Guide tubes 207, 208 and 209 are provided for the rod 60, swaged rod 61 and connected series of balls 63, respectively.

In carrying out my improved method, the stock in the form of a rod 60 that has been heated to forging heat, is introduced into the rolls 56 and 57 where swages are formed thereon on the sides thereof. The swaged rod 61 passes from the pair of rolls 56 and 57 to the rolls 58 and 59, the position of which is adjusted by means of the hand wheel 291 so as to place said rolls in proper position to have the die means provided thereon properly aligned with the swages so as to form ball formations on said swaged rod. The rod with the ball formations formed thereon constitutes spaced ball formations connected together by short narrow neck portions resulting in a series or chain of balls, indicated by the numeral 63 in the drawings. The series or string of balls discharged from the second set of rolls is fed into the twisting off mechanism, which operates in synchronism with the rolls that form the balls. The twisting off mechanism is properly adjusted toward or away from the last pair of rolls 58 and 59 by the hand wheel 192 so that the ball gripping means 169 and the grooved portion of the rotatable members 137 will properly align with the adjoining ball formations, the gripping means engaging a second ball formation of a series or string, such as the ball formation 65 and the rotating twisting or ball rotating means engaging the first ball formation 66 of the string of balls.

Of course, as each length of rod is passed through the machine, the first ball formation 66 of such a string or series of balls formed on a length of rod, will first align with and be engaged by the ball gripping means 169, but as no twisting apparatus will be in engagement therewith, no change will take place in the series or string of balls until the gripping means has released the first ball formation 66 of the series and been returned to a position such that it would engage the second ball formation 65 of said series. After the second ball formation 65 has been engaged by the gripping means, the gripping means and the ball rotating means will move at the same rate of travel as that of the discharge of the series or string of balls from the forming rolls in a direction away from the forming rolls by the action of the cam 100, which will cause the swinging of the frame 79 slightly about the axis of the shafts 77. Shortly after engagement of the gripping means 169 with the ball formation 65. the grooved portions 142 of the rotatable members 137 will engage the ball formation 66 to rotate the same so as to twist it off from the ball formation 65. Inasmuch as the ball formation 65 is held against rotation and is being moved in a direction away from the forming rolls at the rate at which discharge of the string or series of balls from said forming rolls takes place, the twisting off of the ball formation 66 will not in any way affect the remainder of the series or string of balls 63. After a part of a revolution of the rotatable members 137 has taken place, the ball formation 66 will be twisted off and then the cams 146 will release the gripping means 169. When said gripping means releases the ball formation 65 the ungrooved portions 143 of the rotatable member 137 will be on the adjacent sides thereof.

With the ball formation 65 thus released, the cam 100 acts to return the reciprocable frame 79 to its original position, which is such that the gripping means will be in position to engage the next ball formation 64. The same series of operations is then repeated with the ball formations 64 and 65 as took place previously with the ball formations 65 and 66.

The ball formations being uniformly spaced and the position of the gripping means and the ball formation rotating means being positively determined relative to each other and to the ball forming means, the gripping means and the ball rotating means will ordinarily align perfectly with two adjacent ball formations, but if for any reason this should not occur, or if a mis-formed ball formation should be in the series of connected ball formations, which would be either out of alignment with the groove 144 or the concavely shaped gripping jaw 169, the ball formation rotating means and the gripping means will not be damaged due to such occurrence, because, if any obstacle to the forward movement of the gripping member 164 develops, the spring 165 will compress, thus preventing any damage to the gripping means on the gripping member 164. If, however, no obstacle exists against the movement of the member 164 into ball formation engaging position, the spring 165 will not be compressed, as it is a strong spring which will only yield if something interferes with the reciprocating movement of the member 164. Similarly, if the rotating members 137 have an object, such as a mal-formed ball formation, or other projecting means on the series or string of balls, move into position between the same, this will not damage the rotating ball rotating or twisting means because the springs 143 will yield, permitting the rotating members 137 to temporarily separate. However, as soon as such a mal-formed or enlarged formation on a string or series of balls has passed between the members 137, the same will return to their original position with the slides 116 in engagement with the stop members 136. The stop members are adjusted so as to locate the axes of the shafts 124 at exactly the right spacing from each other that the grooved portions 142 of the rotating members 137 will engage properly with a ball formation to rotate the same. The resistance to separation of said shafts 124 can be varied by adjustment of the adjusting means 129. The adjustment of the gripping members 164 so as to firmly grip a ball formation when the high portions of the cams 146 are in engagement with the rollers 149 is obtained by adjusting the member 160 relative to the arm 159 of the bell crank lever associated with each of said cams and rollers.

Obviously, to twist off balls of a different size, it is necessary to provide gripping members 164 and rotating members 137 that are slightly different in size as far as the grooved portions 169 and 144 are concerned. The members 137 and 164, it will be obvious, can be detached and other members of proper formation to place the ball formation rotating means and ball formation gripping means at the proper spacing from each other, can be substituted for the members 137 and 164. Also, if a different sized ball is being made in the machine, the spacing of the ball formations from center to center of each formation lengthwise of the series will be different than that which exists for the size balls that are made in the machine as disclosed. This requires the substitution of a cam having a slightly different throw for the cam 100, as the oscillating movement of the frame 79 has to be just the right amount to move with the series or string of balls during the time that the gripping and twisting off operation of the twisting apparatus occurs.

Figure 7:
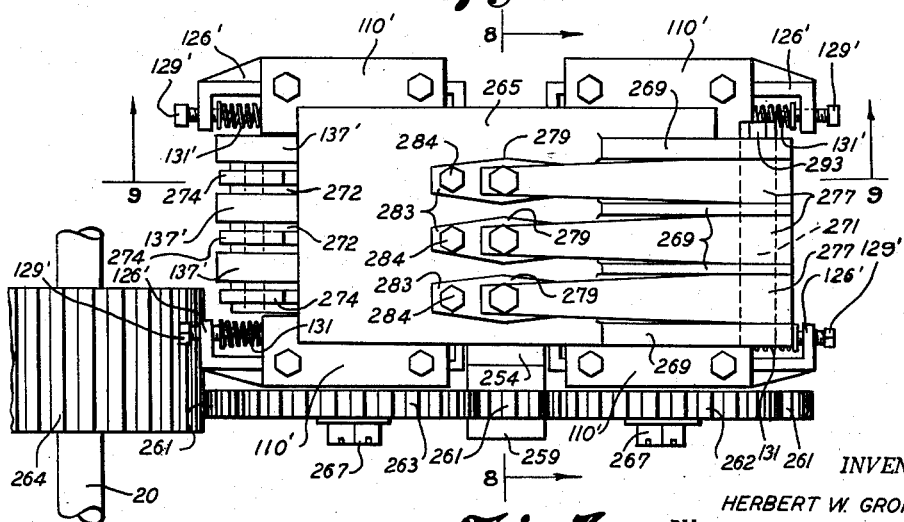
Fig. 7 is a top plan view of a mechanism for twisting off a plurality of ball formations simultaneously.
Figure 8:
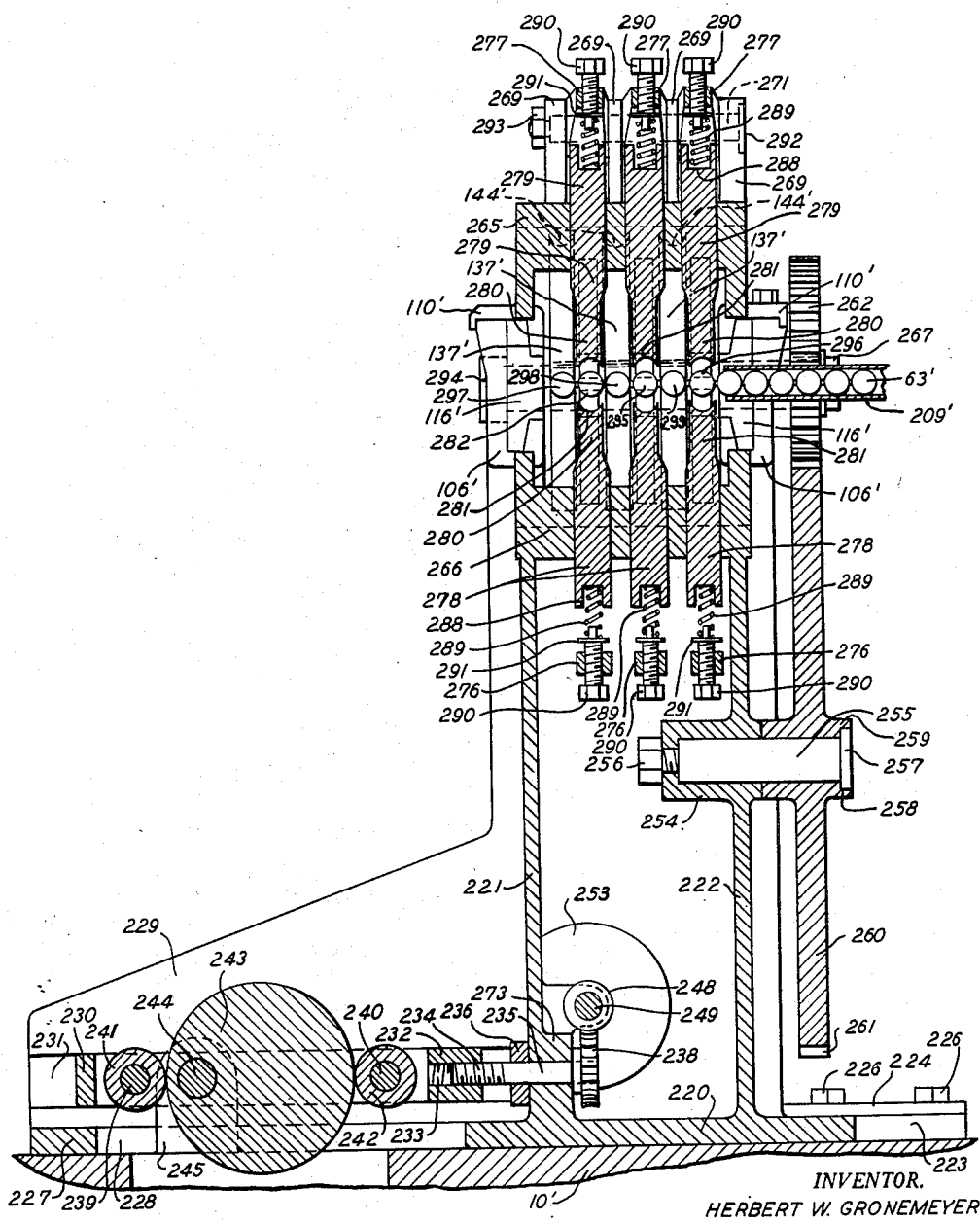
Fig. 8 is a vertical section therethrough taken on the line 8—8 of Fig. 7.

Instead of providing for the twisting off of one ball at a time, the mechanism shown in Figs. 7 to 9, inclusive, can be provided for separating a plurality of balls simultaneously by a twisting off operation. A frame having a base portion 220 and upstanding portions 221 and 222 is mounted between a pair of guide bars 223 mounted on the base 10' and having the plate-like members 224 provided to provide overhanging flanges on said guide members engaging the outwardly extending flanges 225 on the base 220, suitable headed fastening elements 226 being provided for securing said guide members in position. The frame is thus mounted for movement on the base 10' in the direction of the drive shaft 20. An extension is provided on said frame having a bottom wall 227 having an opening 228 therein and having upstanding side walls 229. A rectangular yoke 230 is longitudinally slidably mounted in ways 231 provided in the upstanding walls 229, one of the transverse wall portions 232 of said yoke having a screw-threaded bore 233 therein, with which a screw-threaded portion 234 of a shaft 235 engages.

The shaft 235 has a collar 236 pinned thereto and extends through a bearing 237 in the upstanding wall 221 of said frame. A worm wheel 238 is also fixed to the shaft 235. It will be obvious that rotation of the worm wheel in one direction will turn the screw 234 in the same direction and rotation of the worm 238 in the opposite direction will rotate the screw 234 in the opposite direction, and that such rotation of the screw will cause movement either to the right or left, as viewed in Fig. 8, of the yoke. Mounted on said yoke on transverse shafts 239 and 240 are the rollers 241 and 242. Said rollers are engaged by an eccentric 243, which is mounted on a shaft 244. The shaft 244 is mounted in suitable bearings 245 provided on the extension of the frame and said shaft has a spiral gear 246 thereon, with which the spiral gear 247 on the shaft 20 meshes, said spiral gearing reducing the rotation of the shaft 244 so that it rotates at one-fifth the rate of rotation of the shaft 20. The rollers engaging the eccentric 243 will cause the yoke 230 to reciprocate and thus will cause the frame on which the yoke is mounted to reciprocate lengthwise of the shaft 20. The rate of reciprocation will be once for every five revolutions of the shaft 20. While the reciprocating movement for a given sized ball will always be the same, it is necessary to adjust the beginning and end of each stroke to have the twisting apparatus properly engage with the balls as the same are fed thereto from the forming rolls. In order to obtain such adjustment the rectangular yoke 230 is adjusted by means of the worm wheel 238, with which the worm 248 on the shaft 249 engages. The shaft 249 mounted in suitable bearings 250 on the frame member 221 and has collars 251 and 252 pinned thereto, to prevent endwise movement of the shaft 249 in said bearings. A hand wheel 253 is provided for rotating the shaft 249.

A socket member 254 is provided on the upstanding frame member 222 and a shaft 255 is mounted thereon, said socket having an opening through the end wall thereof, through which the screw-threaded headed member 256 that screw-threadedly engages in a screw-threaded bore in the shaft 255 extends for clamping the shaft 255 in position in the socket. Said shaft has a round head 257 thereon, which is seated in a correspondingly shaped recess 258 in the hub 259 of a gear 260, which has the teeth 261 thereof engaging with the teeth of the gears 262 and 263. The gear 260 meshes with a wide faced gear 264 on the shaft 20. The gears 262 and 263 are thus rotated in the same direction.

The frame having the upstanding walls 221 and 222 has an upper portion providing an upper transverse wall 265 and a lower transverse wall 266, and end walls forming upward extensions of the walls 221 and 222 having portions 106' and cap members 110' together forming guideways for the slides 116' corresponding to the slides 116 previously described in connection with the form of the invention shown in Figs. 1 to 5, inclusive, there being two sets of said slides 116', however, one at each end of the frame substantially in alignment with the walls 221 and 222 thereof. Mounted in said slides 116' are the shafts 124', on which the gears 262 and 263 are mounted to rotate therewith, said shafts 124' being mounted in a suitable manner in said slides 116' to rotate therein, the gears 262 and 263 being held on said shafts by suitable screw-threaded headed fastening elements 267 engaging said shafts 124'. The slides 116' are mounted in a manner substantially the same as the slides 116 previously described, being urged toward suitable stop means to limit their movement toward each other by means of the springs 131' operating in the same manner as the springs 131 previously described, and provided with headed screw-threaded means 129' for adjusting the tension thereof in the same manner as previously described, the brackets 126' corresponding to the brackets 126 in the form of the invention shown in Figs. 1 to 5, inclusive.

The shafts 124' have a plurality of the rotatable members 137' provided thereon. The rotatable members 137' are all fixed on the shafts 124' to rotate therewith, each having a low portion 143' thereon corresponding to the low portion 143 on the rotatable members 137 and a high portion 142' corresponding to the portion 142 on said rotatable members 137. Each of the portions 142' and 143' of the members 137' mounted on one of the shafts 124' are in alignment with each other lengthwise of the shaft so that the transversely curved grooves 144' of the high portions 142' thereof will engage ball formations simultaneously as the shafts 124' are rotated. The members 137' also have cams 146' provided thereon, which correspond to the cams 146 in the form of the invention shown in Figs. 1 to 5, inclusive, rotating with the members 137' and having high portions 147' and low portions 148', the cams 146' alternating with the rotatable members 137' along the shafts 124.

The frame has brackets 268 and 269 thereon having bearings for the pivot members 270 and 271 for the bell crank levers having the arms 272 and 273 on which the rollers 274 and 275 are mounted, said rollers engaging with the cams 146' in a similar manner to that in which the rollers 149 engage the cams 146 in the form of the invention shown in Figs. 1 to 5, inclusive. Each of the bell crank levers mounted on the pivot 270 has an arm 276 extending under the frame member 266 and each of the bell crank levers mounted on the pivot 271 has an arm 277 extending above the frame member 265.

Mounted in the frame member 266 are slides 278 and similar slides 279 are mounted in suitable guideways in the frame member 265. Said slides have gripping fingers 280 thereon that are provided with gripping portions 281 adapted to engage a ball formation, such as the ball formation 282, there being three of the slides 278 and three of the slides 279 and thus three pairs of gripping fingers 280 provided in the form of the invention illustrated in Figs. 6 to 8, inclusive. Each of said slides is provided with a pair of ears 283, said ears having screw-threaded openings therein, in which the screw-threaded headed elements 284 engage, said headed elements 284 having reduced end portions upon which the washers 285 are mounted, with which the compression springs 286 engage, said springs 286 being seated in sockets 287 in the frame members 265 and 266, said springs tending to move the slides in opposite directions, that is, the slides 278 downwardly and the slides 279 upwardly. Said slides are also each provided with sockets 288 for the strong coil springs 289, which are mounted on reduced end portions of screw-threaded headed fastening elements 290 mounted in the arms 276 and 277, said headed fastening elements 290 having reduced end portions having washers 291 thereon, against which the springs 289 bear.

The pivot members 271 have heads 292 mounted in one of the brackets 269 and reduced threaded ends with which the nuts 293 engage, the pivot members 270 being similarly mounted. The shafts 124' are shown as having heads 294 on one end thereof engaging the outer face of one slide 116', the nuts 267 cooperating therewith to hold said shafts from endwise movement in said slides.

In carrying out the method of twisting off a plurality of balls at the same time by the apparatus shown in Figs. 7 to 9, inclusive, the balls are made in the same manner as previously described and are discharged from the forming rolls through a guide tube 209' corresponding to the tube 209 previously described, the connected ball formations 63' being similar to those previously described and constitute spaced ball formations connected together by short narrow neck portions resulting in a series or chain of balls. The twisting off mechanism is properly adjusted toward or away from the last pair of rolls by the hand wheel 253 so that the ball gripping means 281, similar to the previously described ball gripping means 169 and the grooved portions 144' of the rotatable members 137' will properly align with the adjoining ball formations. The gripping means will engage the ball formations 282, 295 and 296 and the rotating twisting or ball rotating means will engage the ball formations 297, 298 and 299. The ball formation 296 will not be separated by the twisting mechanism from the string of balls 63' but the other ball formations 297, 282, 298, 295 and 299 will be separated from each other.

In Fig. 9 the rotatable twisting members 137' will be rotating in the direction indicated by the arrows thereon and the twisting operation will have been completed and the ball formation, such as the ball formation 282, will be actually separated from the adjacent ball formations. However, as the rotation of the rotatable twisting members 137' continues the portion 142' of said rotatable members will engage ball formations, such as the ball formations 297, 298 and 299. However, before this takes place the high portions 147' of the cams 146' will be engaging the rolls 274 and 275 so as to cause the gripping portions 281 of the gripping fingers 280 to engage the ball formations aligning therewith, such as the ball formations 282, 295 and 296. Accordingly the ball formations 297, 298 and 299 will be twisted off from the adjoining ball formations 282, 295 and 296, thus separating the balls 297, 282, 298, 295 and 299 from the remaining balls in the connected series.

At this movement of the parts takes place and the twisting off operation occurs, the series or string of balls 63' is, of course, moving toward the left in Fig. 8 and the entire frame on which the twisting mechanism is mounted is moving toward the left at the same rate as the string or series of balls 63' is moving through the guide tube 209' from the forming rolls, due to the movement of the eccentric 243, which moves the yoke 230 toward the left and the upstanding frame along therewith. After the parts reach the position shown in Fig. 9 the balls are released by the gripping means and the rotatable twisting members and the reciprocable frame are moved back to the right to the original position thereof by means of the eccentric 243. The length of stroke of the reciprocating movement is equal to a string of five ball formations, that is, the amount of length of the series or string occupied by five ball formations and the connections between the same. The time interval occupied by one complete reciprocation is equal to five times the length of time it requires to form a ball formation, the various gear drives and reduction gears being properly proportioned to do this. While a mechanism for separating five ball formations simultaneously is disclosed, obviously the number can be increased or decreased from that illustrated, as may be found desirable from a practical standpoint. Any suitable means may be provided for discharging the separated ball formations from the machine. The oncoming series of connected ball formations 63' will push the disconnected or separated balls out of the left hand end of the twisting mechanism viewed in Fig. 8. Guides 300 extending between the frame portions 265 and 266 are, preferably, provided between each pair of rotating twisting members 137'. Said guides have concave ball guiding portions 301 aligning with the gripping members 281 to aid in guiding the separated balls out of the separating mechanism.

The gripping means and the ball rotating means will ordinarily align perfectly with the alternating ball formations, but if for any reason this should not occur, or if a misformed ball formation should be in the series of connected ball formations, which would be either out of alignment with the groove 144' of a rotatable twisting member 137', or the gripping jaw 281 of a gripping or holding member, the ball formation rotating means and the gripping means will not be damaged due to such occurrence. This is due to the provision of the springs 131', which will compress, permitting movement of the slides 116' away from each other in the same manner as in the form of the invention shown in Figs. 1 to 5, inclusive, and due to the provision of the springs 289, which are so strong that ordinarily these are not compressed during the movement of the gripping fingers into gripping position by means of the bell crank levers, but if an obstacle is interposed between the gripping fingers so as to prevent their moving into proper gripping position relative to a ball formation, said springs 289 will compress to prevent damage to the gripping members. The springs 286 serve to return the slides and bell crank levers and hold the rollers 274 and 275 in engagement with the cam surfaces of the cams which these rollers engage.

What I claim is:

1. In a machine for making steel balls, means for separating connected ball formations from each other comprising a pair of members mounted to rotate about parallel axes and having means thereon simultaneously engaging a ball formation on opposite sides thereof to rotate the same, means for rotating said members in the same direction, and holding means for an adjacent ball formation closely adjacent said pair of rotatable members.

2. In a machine for making steel balls, means for separating connected ball formations from each other comprising a pair of members mounted to rotate about parallel axes and having means thereon simultaneously engaging a ball formation on opposite sides thereof to rotate the same during a portion of each rotation thereof, means for rotating said members, holding means for an adjacent ball formation comprising a pair of reciprocable members, and means for reciprocating said members in timed relation to the engagement of said means on said rotatable members with said first ball formation.

3. In a machine for making steel balls, means for separating connected ball formations from each other comprising a pair of members mounted to rotate about parallel axes and having means thereon simultaneously engaging a ball formation on opposite sides thereof to rotate the same during a portion of each rotation thereof, means for rotating said members, holding means for an adjacent ball formation comprising a pair of reciprocable members, means for reciprocating said members in timed relation to the engagement of said means on said rotatable members with said first ball formation, and means for moving said separating means back and forth in the direction of said axes in timed relation to said reciprocating means.

4. In a machine for making steel balls, means for separating ball formations connected by narrow neck portions from each other comprising a pair of members mounted for rotation about parallel axes having arcuate grooved portions concentric to the axes of rotation thereof projecting therefrom over a portion of the periphery thereof adapted to engage a ball formation between the same, means for simultaneously rotating said members in the same direction to rotate said ball formation about an axis extending through said neck portion and parallel to the said axes, and means engaging an adjacent ball formation to hold it against rotation.

5. In a machine for making steel balls, means for feeding a plurality of connected ball formations lengthwise of the connected series of formations, and ball severing mechanism receiving the connected ball formations comprising members rotatable about spaced axes and having peripheral portions simultaneously engaging a ball formation to rotate said formation between the same, means engaging an adjacent ball formation to hold it against rotation, and means for moving said holding means and said rotatable members in the direction of feed of said connected series and simultaneously rotating said rotatable members in the same direction.

6. In a machine for making steel balls, mechanism for separating connected ball formations comprising a pair of members mounted to rotate about axes parallel to each other, means for rotating said members in the same direction, said members being spaced to receive a ball formation therebetween and having a grooved periphery engaging said ball formation to rotate it between the same, and holding means adjacent said pair of members engaging a ball formation adjacent said rotated ball formation to hold said adjacent ball formation against rotation.

7. In a machine for making steel balls, mechanism for separating connected ball formations comprising a pair of members mounted to rotate about axes parallel to each other, means for feeding said connected ball formations to said mechanism parallel to said axes, means for rotating said members in the same direction, said members being spaced to receive a ball formation therebetween and having means engaging said ball formation to rotate it between the same, and holding means engaging a ball formation adjacent said rotated ball formation to hold said adjacent ball formation against rotation.

8. In a machine for making steel balls, mechanism for separating connected ball formations comprising a pair of members mounted to rotate about axes parallel to each other, means for feeding said connected ball formations to said mechanism parallel to said axes, means for rotating said members in the same direction, said members being spaced to receive a ball formation therebetween and having means engaging said ball formation to rotate it between the same, holding means engaging a ball formation adjacent said rotated ball formation to hold said adjacent ball formation against rotation, and means for moving said separating mechanism in the direction of feed simultaneously with engagement of said rotating means with a ball formation.

9. In the method of making steel balls, progressively hot rolling a row of ball formations connected by short narrow neck portions of much smaller diameter than said ball formations lengthwise of an elongated steel shape while holding said shape against rotation on its axis, simultaneously moving said row of formed connected ball formations by translation lengthwise of itself away from the formations being rolled, and exerting torsion on said short narrow neck portions between adjacent rolled ball formations in spaced relation to the formations being rolled immediately after rolling the same during continued movement of said row of connected formations in the same direction.

10. In the method of making steel balls, progressively hot rolling a row of ball formations connected by short narrow neck portions of much smaller diameter than said ball formations lengthwise of an elongated steel shape, simultaneously moving said row of formed connected ball formations by translation lengthwise of itself away from the formations being rolled, and exerting torsion on said short narrow neck portions between adjacent rolled ball formations in spaced relation to the formations being rolled progressively lengthwise of said row immediately after rolling the same during continued movement of said row of connected formations in the same direction.

11. In the method of making steel balls, progressively hot rolling a row of ball formations connected by short narrow neck portions of much smaller diameter than said ball formations lengthwise of an elongated steel shape while holding said shape against rotation on its axis, simultaneously moving said row of formed connected ball formations by translation lengthwise of itself away from the formations being rolled, and exerting torsion on said short narrow neck portions between adjacent rolled ball formations in spaced relation to the formations being rolled by relatively rotating adjacent ball formations about an axis extending through the narrow neck portion connecting the same immediately after rolling the same during continued movement of said row of connected formations in the same direction.

12. In the method of making steel balls, progressively hot rolling a row of ball formations connected by short narrow neck portions of much smaller diameter than said ball formations lengthwise of an elongated steel shape while holding said shape against rotation on its axis, simultaneously moving said row of formed connected ball formations by translation lengthwise of itself away from the formations being rolled, and exerting torsion on said short narrow neck portions between adjacent rolled ball formations in spaced relation to the formations being rolled by relatively rotating adjacent ball formations about an axis extending through the narrow neck portion connecting the same progressively lengthwise of said row immediately after rolling the same during continued movement of said row of connected formations in the same direction.

13. In the method of making steel balls, progressively hot rolling a row of ball formations connected by short narrow neck portions of much smaller diameter than said ball formations lengthwise of an elongated steel shape, simultaneously moving said row of formed connected ball formations by translation lengthwise of itself away from the formations being rolled, and simultaneously exerting torsion on a plurality of said short narrow neck portions between adjacent rolled ball formations in spaced relation to the formations being rolled immediately after rolling the same during continued movement of said row of connected formations in the same direction.

14. In the method of making steel balls, progressively hot rolling a row of ball formations connected by short narrow neck portions of much smaller diameter than said ball formations lengthwise of an elongated steel shape, simultaneously moving said row of formed connected ball formations by translation lengthwise of itself away from the formations being rolled, and simultaneously exerting torsion on a plurality of said short narrow neck portions between adjacent rolled ball formations in spaced relation to the formations being rolled by relatively rotating adjacent ball formations about an axis extending through the narrow neck portion connecting the same immediately after rolling the same during continued movement of said row of connected formations in the same direction.

References Cited in the file of this patent

UNITED STATES PATENTS

| Number | Name | Date |
|---|---|---|
| 365,473 | Hinsdale | June 28, 1887 |
| 600,532 | Hill | Mar. 15, 1898 |
| 1,309,938 | Ellsworth | July 15, 1919 |
| 1,367,299 | Canda | Feb. 1, 1921 |
| 1,636,808 | Canda | July 26, 1927 |
| 1,674,112 | Hering | June 19, 1928 |
| 1,726,464 | Abbott | Aug. 27, 1929 |
| 1,746,671 | Munro | Feb. 11, 1930 |
| 2,249,325 | Pruckner | July 15, 1941 |
| 2,269,899 | Brandt | Jan. 13, 1942 |
| 2,334,873 | Held | Nov. 23, 1943 |
| 2,355,523 | Gartin | Aug. 8, 1944 |
| 2,499,681 | Price | Mar. 7, 1950 |